Sept. 8, 1964   NORIOMI OCHIAI   3,148,367
TARGET IDENTIFICATION SYSTEM BY RADAR
Filed March 20, 1959   3 Sheets-Sheet 2
*Fig. 4*
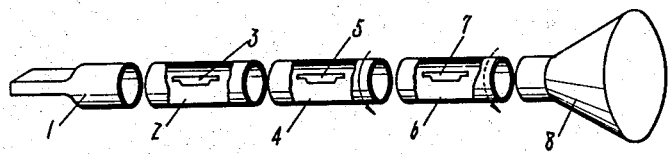
*Fig. 5*
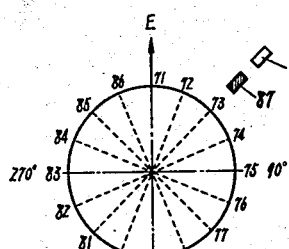
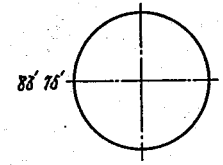
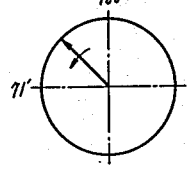
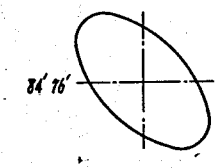
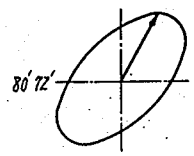
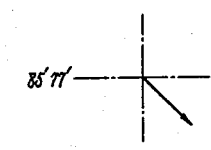
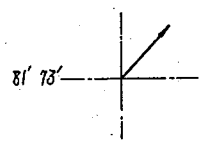
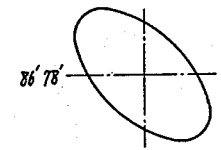
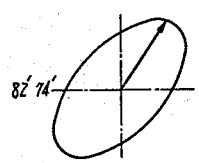
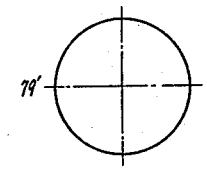
INVENTOR
BY
ATTORNEY Sept. 8, 1964   NORIOMI OCHIAI   3,148,367
TARGET IDENTIFICATION SYSTEM BY RADAR
Filed March 20, 1959   3 Sheets-Sheet 3

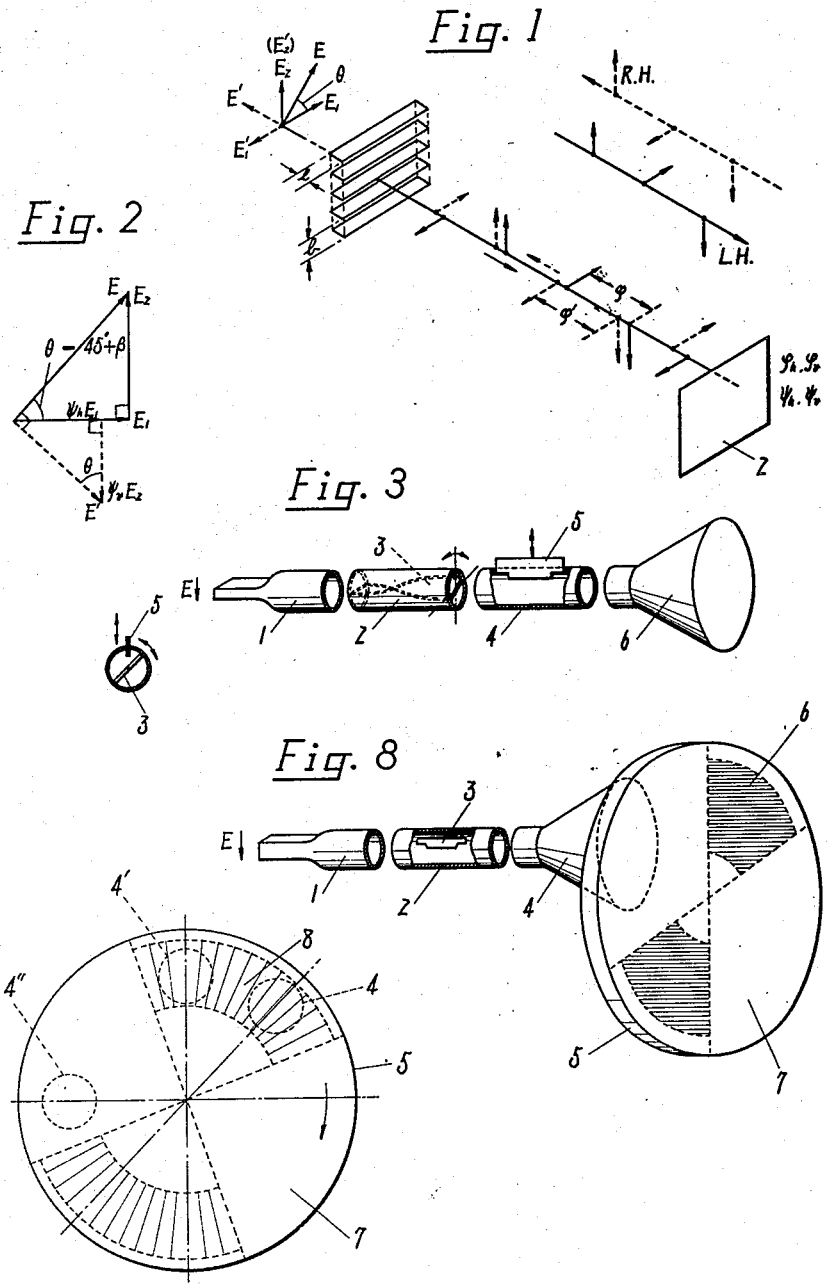

INVENTOR

BY

ATTORNEY

United States Patent Office

3,148,367
Patented Sept. 8, 1964

3,148,367
TARGET IDENTIFICATION SYSTEM BY RADAR
Noriomi Ochiai, Tokyo, Japan, assignor to Kabushiki
 Kaisha Tokyo Keiki Seizojo, Tokyo, Japan, a corporation of Japan
Filed Mar. 20, 1959, Ser. No. 800,866
Claims priority, application Japan Mar. 24, 1958
2 Claims. (Cl. 343—5)

The invention relates to a target identification system by radar.

In the radar of heretofore known PPI (pulse position indicator) systems, generally speaking, the echo signals reflected from the targets modulate the intensity of electron beams in a cathode ray tube and a black and white image of the targets are thereby produced on the scope. Since the dimensions of the target are very much larger than the resolution of the radar, for instance, in the case of an island on the sea, the target can be easily identified, judging from the outline of the image appearing on the scope. However, more precise identification of the specific parts thereof, such as villages, towns, forests, rocky headlands or sandy beaches, cannot always be accomplished using presently known techniques. In a similar way, when the target is smaller in its dimensions than those of the resolution of the radar, for instance, in the case of small boats, buoys or the like, it is no longer possible to identify the form of the target from the outline of the image on the scope.

It is therefore a main object of the present invention to provide an improved target identification system without any of the above mentioned drawbacks.

It is another object of this invention to provide an effective system of the kind above referred to, in which a sharper identification of the target with respect to the kind, shape and nature thereof can be obtained.

It is still another object of the invention, in which sharper and more effective identification of the target is obtained by composing a plurality of single colored, echo signals resulting from differently polarized waves into a single image.

The invention will be hereinafter more fully described, together with further advantages to be derived therefrom, with reference to the accompanying drawings, in which:

FIGURE 1 shows an explanatory representation, illustrating the effects obtainable when circularly or elliptically polarized waves are projected against a reflecting target surface;

FIGURE 2 is an explanatory representation, illustrating amplitude and phase relationships between linearly polarized waves radiated from an antenna system before their arrival at a circularizer, and linearly polarized echo waves after passage through the circularizer;

FIGURE 3 shows a modification of the circularizer, especially adapted to produce elliptically polarized waves;

FIGURE 4 is a perspective, but partly exploded view, illustrating an embodiment of the continuous polarization-converting means employed in the system according to the invention;

FIGURE 5 is an explanatory representation, illustrating relations for modifying the polarization of a wave continuously using the arrangement shown in FIGURE 4;

FIGURE 8 represents a modification of the polarization-converting means, for emitting a certain polarized wave during a predetermined time interval;

Figure 6:
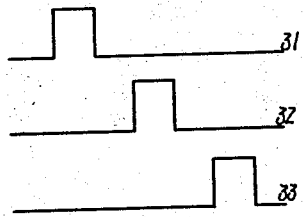
FIGURE 6 shows voltage diagrams, illustrating the gate voltages developed in dependence upon the kinds of selected polarized waves.

According to the invention, a plurality of differently polarized waves are used, each of the echoes is employed to produce a specific single color image, for instance, red-, blue- or yellow-colored, and combined in a resultant color image to identify the kind and nature of the target as will be apparent from the following description.

For example, a target consisting of a simple plane will first be considered. Assuming that the plane is much wider relative to the projected wavelength and the curvature of the plane is gradual relative to the same wavelength. The intensity of echo signals in the case of horizontally polarized waves provides no significant difference relative to that in the vertically polarized waves. It should be noted, however, that should there be ground reflection, an interference between the direct waves and the reflected waves would take place and thus the antenna pattern would be in effect subdivided into many lobes. There results more or less a difference in the echo signal intensity because of the difference to some degree in the shape of the patterns produced in the horizontally and vertically polarized waves. On the other hand, if circularly polarized waves are employed as the radar waves, there will be an appreciably variable difference in the echo signal intensity relative to the linearly (horizontally or vertically) polarized waves and depending upon the kind of material of the reflecting surface. If, for instance, the reflecting plane consists of metal and is positioned to be perpendicular to the passage of the waves, which are in this case assumed to be circularly polarized, the reflected waves are equally polarized circularly, but the rotational direction of the electric field vector will be reversed, so that substantially none of the reflected waves are picked up by the radar antenna system. Thus, the resulting signal intensity of the reflected waves would amount to, say 1/1000 (power ratio, —30 decibels) the value obtainable with linearly polarized waves. On the other hand, if the reflecting surface is made of wood, and when circularly polarized waves are projected thereon, the reflected waves will be elliptically polarized because of a different phase shift at the reflecting point, as well as of a different coefficient of reflection thereat, from those values obtainable with reflecting metal surfaces. Thus the reflected signal intensity would not be reduced as much as those of linearly polarized waves, as in the case of metallic reflecting surfaces.

Now, consider such a target as consisting of two metallic plane surfaces arranged at right angles to each other, which are further assumed to be perpendicular to the horizontal. When radar waves are projected upon the target in parallel relation to the symmetrical plane thereof and in the horizontal direction, double reflection will take place and the reflected waves return in the opposite direction to that of the initial projection, in other words, in the direction of incidence. If circularly polarized waves are transmitted in this case, the reflected waves from the target will be similarly polarized, because of double reversal of the rotational direction of the circularly polarized waves. Thus the resulting rotational direction of the electric field vector coincides with the initially projected waves from the radar. Thus, in this case, there will be substantially no difference in the reflected signal intensity between the cases of employing circularly and linearly, i.e. horizontally or vertically, polarized waves. In this case, however, when linearly polarized waves having an angle of 45 degrees relative to the horizontal are employed, the reflected waves from the target will be again linearly polarized, having an angle of −45 degrees, so that the antenna system could not pick them up. Thus, in the case of linearly polarized waves, having an inclination angle of 45 degrees in the plane of polarization, the echo signal intensity would be highly attenuated.

Further, the corner reflector known per se as navigational aids for use with radar is considered as an efficient target. With this kind of target, the projected electric waves thereupon make a triple reflection as is commonly known to those skilled in the art. Should the projected waves be circularly polarized, the last reflected waves from the target are reversed in the rotational direction of circularly polarized waves, compared with that of the projected waves, as is the case with the single reflection from a metallic surface. Thus, with use of circularly polarized waves, the reflected signal intensity will be about 1/1000 (power ratio, −30 decibels) the value obtainable with linearly (more specifically, horizontally or vertically) polarized waves. While, when linearly polarized waves, having an angle of 45 degrees to the horizontal are used, the last reflected waves after triple reflections are similarly polarized waves, having the same angle of 45 degrees, so that the reflected signal intensity provides no significant difference as compared with the transmitted horizontally or vertically polarized waves. It will be clear from the foregoing, that when the target is of a simple shape, the nature, kind and material thereof can be identified to a certain degree by selecting in a suitable way the kinds of polarized waves to be transmitted and by comparing the received echo signal intensities.

As is well known, frequently encountered targets are numerous and different. However, a complex target such as a ship or the like, is considered as an assembly of a number of simple reflecting surfaces, so that an identification of the complex target can be realized by selecting suitably the polarization of the transmitted radar waves.

Experimental data of echo signal intensities measured with the use of horizontally, 45-degree- and circularly polarized radar waves projected upon various kinds of targets are shown in the following table:

| Kind of target | Power Ratio of Echo Signals | | Remarks |
|---|---|---|---|
| | Circularly polarized wave | 45° polarized waves | |
| | Horizontally polarized wave | Horizontally polarized wave | |
| Steel ships | Nearly 1 | Nearly 1 | Fishing ships and cargo vessels. |
| Wooden ships | 0.13–0.40 | | |
| Raining droplets | 0.02–0.01 | | |
| Buoys | 0.023 | Nearly 1 | |
| Light house on pier | 0.06 | Nearly 1 | |
| Precipice | 0.2–0.4 | | |
| Power transmission tower | 0.81 | | |
| Mile post | 0.006 | | |
| Plane metal plate | 0.006–0.002 | 1 | Single reflection. |
| Perpendicularly crossed plane metal plates | 1 | 0.03–0.06 | Double reflection. |
| Corner reflector | 0.003–0.001 | 1 | Triple reflection. |

As will be clear from the above table, when circularly and linearly (but horizontally) polarized waves are employed, the discrimination of a marine steel vessel from a wooden ship, as well as that of a double reflection from metal plates from single reflections from single metal plate, can be sharply carried into effect. On the other hand, with use of 45°-polarized waves, a clear discrimination of double reflection from single or triple reflection will be obtained. Buildings, bridges and the like in towns and cities contain many targets providing double reflections, so that 45°-polarized waves may be advantageously utilized to discriminate them from others.

When a special discrimination of echoes is required between a target between reflected waves from the sea surface or any floating obstacles thereon, such as timbers or the like, it will be advantageous additionally to employ special elliptically polarized waves. To clarify this, consider first a simple example as shown in FIGURE 1 for projecting circularly polarized waves perpendicular to a metal plate target. FIGURE 1 shows an example employing a metal plate circularizer. In FIGURE 1, the width of the metal grid is denoted by "$l$," and the distance between two adjacent grid plates by "$b$," the angle between the longitudinal axis of the metal grid and the vector of the electric field of the incoming linearly polarized waves E being now assumed at 45 degrees. The waves are now analysed into the first component $E_2$ perpendicular to the longitudinal axis of the grid and the second component $E_1$ parallel to the axis. As is commonly known, the first component $E_2$ passes through the grid with the velocity of free space transmission, while the second component traverses therethrough at the velocity depending upon the distance between the grid plates, i.e., similar to the transmission inside the waveguide ($TE_{01}$-mode). Thus, by selecting a proper value of the grid width, both components may have a relative phase difference of 90 degrees. For instance, when the distance between adjacent grid plates $b$ is smaller than the wavelength $\lambda$, the component $E_2$ is phase shifted during passage through the metal grid by $2\pi l/\lambda$, while that of the other component $E_1$ will be phase shifted to $2\pi l/\lambda g$. In order to obtain the desired effect, the difference in these phase shift values is selected to be $\pi/2$. Thus $$2\pi l/\lambda - 2\pi l/\lambda g = \pi/2$$

$$l\lambda = \frac{1/4}{1-\mu}; \text{ if } \mu = \lambda/\lambda g = [1-(\lambda/2b)^2]^{1/2}$$

Therefore, if suitable values are selected for $b$ and $l$, a phase difference of $\pi/2$ between the both components can be realized. After passage through the circularizer, the electric waves become circularly polarized waves, as both components are perpendicular to each other with equal amplitudes and with a phase difference of 90 degrees. On the contrary, if circularly polarized waves pass through the circularizer, they will be converted into linearly polarized waves. In FIGURE 1, the relative positions of both components in the space after passage through the circularizer are also shown. Electric field vectors represented by full lines denote the incoming waves to the metallic reflecting surface, while those illustrated by dotted lines represent the reflected waves. Generally, when electric waves are projected obliquely upon a metallic reflecting surface, the phase shift of the component within the incidence plane at the reflecting point will be negligible, while that of the component within the reflecting plane will be 180 degrees. The example shown is substantially this case, more specifically, the case of normal incidence. Thus, in this case, the aforementioned phase shift is carried into effect, and the reflecting coefficients of the both components are equal to each other. Thereby the relative relation therebetween is as shown diagrammatically in FIGURE 1, wherein the incident waves are shown as being left-handed circularly polarized and the reflected waves are represented as being right handed circularly polarized. Thus, the reflected waves from a metallic reflecting surface remains circularly polarized, the rotational direction of electric field thereof being, however, reversed relative to that of the incoming waves. The phase difference between vectors of two electric fields, the planes of polarization of which are perpendicular to each other, will amount to a definite value, $\pi/2$, as in the case of incidence and reflected waves under consideration as shown. Thus, $$\varphi = \varphi' = \pi/2$$

When these reflected waves pass again through the original circularizer, they are converted to linearly polarized waves (the vectors of which are denoted by E'). As is shown, the vector of the electric field E' is shifted by 90 degrees in its plane of polarization with respect to that of the original vector E, so that with this antenna system substantially none of sensitivity to the single reflection from the metal plate is attainable. It will be clear therefore, that the identification of a single reflection here considered can be realized, by changing linearly polarized waves to circularly polarized and comparing the results.

As a further example, the identification of single reflection from a wooden plate will now be considered. In this case, somewhat modified elliptically polarized waves may be preferably utilized to obtain the desired effect.

Consider a case wherein in FIGURE 1 the metal plate 2 is replaced by a wooden plate. The reflecting coefficient and phase shift at the reflecting point of the component along the incidence plane are denoted by $\varphi_v$ and $\psi_v$, respectively, and those of the component along the reflecting plane by $\varphi_h$ and $\psi_h$, respectively. Then, $$\varphi_h - \varphi_v = \pi + \varphi_1$$

Thus, the difference in phase shift of the both components at the reflecting point is different from that obtained with the use of the metal plate, by a value of $\varphi_1$. It is now assumed that the circularizer is redesigned so as to provide $\theta = 45° + \beta$; $\varphi = \pi/2 + \varphi_2$. When $2\varphi_2 = \varphi_1$, both time components of the reflected waves are in phase with each other, after their passage through the circularizer, as diagrammatically shown by vectors $E'_1$ and $E'_2$ in FIGURE 1. In order to make the resultant waves E' perpendicular to the linearly polarized incidence waves E, the following relations should further be satisfied, as shown in FIGURE 2.

$$\frac{\psi_h E_1}{\psi_v E_2} = \frac{E_2}{E_1}; \frac{\psi_h}{\psi_v} = \left(\frac{E_2}{E_1}\right)^2 = \tan^2 \theta$$

When such is done, the antenna input by the present reflected waves will be nil. To fulfil the above conditions, the values $l$ (or $b$) and $\theta$ are made variable so as to satisfy the aforementioned two conditions depending upon the reflecting coefficient and phase shift of the reflecting body. By modifying the values $l$ (or $b$), the phase relationship between both components is arranged, and at the same time by changing the value of $\theta$, the ratio of amplitude between said components is adjusted. When the resulted phase difference amounts to $\pi/2$ and the angle $\theta$ is 45 degrees, the produced waves are circularly polarized, while, when deviated therefrom they will be elliptically polarized.

FIGURE 3 shows a practical embodiment to realize the last mentioned principle. In the present device as shown, the phase difference and amplitude ratio between horizontal and vertical components of the electric field can be independently modified. This device provides a means, for instance, to minimize "sea-clutters." In FIGURE 3, element 1 is a means for converting the TE$_{01}$-mode of a rectangular wave guide to the TE$_{11}$-mode of a circular wave guide, while element 2 represents a flexible twist of wave guide adapted to rotate the plane of polarization of the electric field from the vertical to a 45°-inclined angular position. The flexibility provides the possibility of rotating said plane to any desired angle ranging up to 45 degrees to and fro. A metal fin circularizer 5 is inserted in the vertical axis of circular wave guide 4 to a certain depth thereof, the insertion depth being variable. The arrangement is such that when the depth is vertically adjusted to a predetermined value, and the electric field leaving wave guide element 1 has a component polarized at an angle of 45 degrees with respect to circularizer 5, circularly polarized waves are obtained. In such an arrangement, when a plane reflector consisting of a non-metallic material occupies a position at right angles to the passage of propagating waves, the angle of rotation, as well as the insertion depth of the circularizer can be adjusted so as to minimize the antenna input by the echo signals.

While, on the other hand, in case of the reflector inclined at any other angle to the propagating direction of the radar waves, similar effects may be obtained, when the above arrangement is somewhat modified from that aforementioned. The details thereof, have been omitted herefrom, for clearness of the description as set forth herein.

In the foregoing explanation, although only several simpler examples are explained, it will be clear, however, the identification of various targets can be made appreciably easier with use of horizontally, vertically, 45°-, circularly, elliptically polarized waves and the like.

As will be clearly seen from the table set forth hereinbefore, a sharp discrimination between steel and wooden marine vessels is realized with the use of circularly and linearly polarized waves. In the analogous way, a clear identification of metallic double reflection from metallic simple or triple reflection can be successfully brought into effect.

There are various ways for carrying out the desired color mixing. As an example, a corresponding number of monochrome, or black- and white cathode ray tubes are employed and optically the images are combined after passage through color filters, such as, red, blue and green. In order to avoid difficulties in the high speed change-off between various polarized waves in radar, a plurality of memory devices may be arranged at a suitable intermediate position, the signals obtained with use of a set of various polarized waves may be once accumulated therein, and the read-out information therefrom may be combined in a cathode ray tube for color displays. In this case, the scanning speed to read-out from the memory devices is selected so as to match with the time of persistence of the cathode ray tube, thus obtaining improvements in the color effect.

FIGURE 4 shows an embodiment adapted for use in the present invention to transmit various polarized waves and is especially suitable for pencil beams. In FIGURE 4, element 1 is means for converting the TE$_{11}$-mode of a rectangular wave guide to the TE$_{11}$-mode of a circular wave guide, while element 2 is a circular wave guide provided therein with wave polarization converting means 3 adapted to convert linearly polarized wave into circularly polarized waves and is shaped by way of example, in the form of metal fin circularizer. Circular wave guide 4 has fitted therein a converting means 5 adapted to convert circularly polarized waves into linearly polarized waves and is shaped, by way of example, in the form of metal fin decircularizer, wave guide 4 is arranged to be rotated about its axis. Circular wave guide 6 is provided therein, by way of example, with a metal fin circularizer 7 and adapted to be rotated about its axis as desired. 8 denotes a cone type horn. In the present embodiment, it is assumed for the convenience of description that all of the circularizers and decircularizer are of the same construction and constructed as the metal fin type for 90°-phase shifting. The electric field of linearly polarized waves passing through circularizer 3 is converted to circularly polarized waves, which are, however, converted into linearly polarized waves by passage through decircularizer 5. Furthermore, by relating the circular wave guide 4, the plane of polarization may be angularly shifted. When the waves further pass through the circularizer 7, and depending upon the rotation of the plane of polarization, gradual conversions of polarization of the wave from linearly- through elliptically-, circularly-, elliptically- to linearly polarized waves are successively carried into effect. These converting relations are diagrammatically illustrated in FIGURE 5 wherein the direction of the input electric field of the circular wave guide 2 shown in FIGURE 4 is denoted by reference character E. It is assumed that the circularizer 3 arranged in the circular wave guide 2 is positioned at angle of just 45 degrees relative to E, the position corresponding to 87 in FIGURE 5. Now it is further assumed, that the circularizer 7 fitted within the wave guide 6 shown in FIGURE 4 is kept stationary as shown by reference numeral 88 in FIGURE 5, at angle of 45 degrees relative to E. When wave guide 4 according to FIGURE 4 is rotated, the output will take the form of a linearly polarized wave by the influence of the de-circularizer arranged therein, whereby the plane of polarization rotates in an advanced state by 45 degrees, or by —45 degrees, relative to the metal fins of the decircularizer. When the plane of polarization of the linearly polarized waves remains at several positions denoted by 71, 72 . . . 86 in FIGURE 5, the polarized waves entering the last cone type horn are shown diagrammatically in the figure by numerals 71', 72' . . . 86'. More specifically, wave conversions from linearly-, through elliptically-, circularly-, elliptically-, to linearly polarized waves are successively carried out. In this case, a conversion into two kinds of linearly polarized waves on two planes perpendicular to each other may be also carried into effect. Furthermore, when the position 88 of the circularizer is shifted, the plane of polarization of the linearly polarized waves entering the cone type horn may be rotated as desired.

Figure 7:
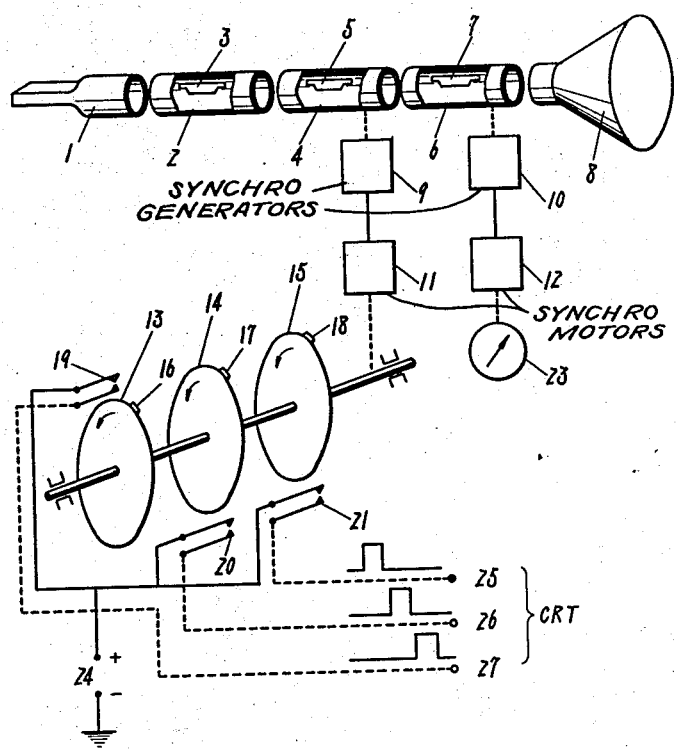
FIGURE 7 shows a diagrammatic representation of an embodiment adapted to select-out the desired polarized waves by remote control.

In order to select-out a suitable one of the afore-mentioned kinds of polarization, sliding means must be provided at the rotary mechanism to produce gate voltages as shown in FIGURE 6 for the cathode ray tube, which are then applied to the cathode or control grid of the CRT for color displays, for instance, of the shadowmask type. In FIGURE 6, numerals 31, 32 and 33 denote gate voltages for red, blue and yellow colors, respectively. Under some circumstances, the selection of polarized waves is preferably carried out by remote control. FIGURE 7 shows an embodiment, wherein as the polarization converting means of FIGURE 4 are employed.

Referring to FIGURE 7, a synchro-generator 9 is adapted to transmit rotation of the circular wave guide 4, in which the decircularizer is arranged, while a further synchro-generator 10 is arranged to transmit rotation of the circular wave guide 6, in which a circularizer is fitted. Synchro-motors 11 and 12 are driven by generators 9 and 10 respectively. Discs 13, 14 and 15 revolve in synchronization with the circular wave guide 4 through the intermediary of synchro-motor 11. On the periphery of discs 13, 14 and 15 are mounted cams 16, 17 and 18, respectively. Switches 19, 20 and 21 are adjustably mounted to occupy any desired position around the peripheries of the cams and are operated thereby. A terminal 24 is adapted to connect a voltage source for furnishing the gate voltage for the CRT via terminals 25, 26 and 27. An indicator 23 indicates the rotational angle of circular wave guide 6 and is driven by synchro-motor 12.

When the switches 19, 20 and 21 are adjusted for the polarized waves being employed, the corresponding voltages are thereby produced and supplied through terminals 25, 26 and 27 to the CRT for controlling the electron beams corresponding to the colors. As an alternative, the circular wave guide 6 is rotated at a certain ratio and a plurality of cam-and-switch connections are operated thereby in a suitable manner and various desired, polarized waves may be selected out.

While in the aforementioned embodiment, the synchromechanism is employed to obtain the desired synchronization between the change-off of polarized waves and that of the gate voltage, a suitable mechanically operating mechanism may be substituted therefor. For instance, the cam mechanism is mechanically connected to the polarized-wave change-off mechanism and the gate voltage is controlled by the switching operation.

Under some circumstances, it may be recommended to minimize the loss of efficiency caused by the gradual conversions of the polarization during a certain time interval when one and the same polarized waves are transmitted continuously and the change-off to other kind of polarized waves is carried out in an abrupt manner. An example of this kind of operation is diagrammatically illustrated in FIGURE 8. This arrangement serves for use to two-way change-off circularly and linearly polarized waves.

Now referring to FIGURE 8 more in detail, element 1 is means for converting the $TE_{01}$-mode of a rectangular wave guide to the $TE_{11}$-mode of a circular wave guide, while circular wave guide 2 has provided therein a metal fin type circularizer 3. A cone type horn 4 is connected to guide 2 and is opposite a rotatable disc member 5 which substantially consists of a suitable material, for instance, polystyrene-foam, which may be considered transparent to electric waves. The aforementioned disc member 5 is, however, provided with radially extending non-transparent sectors 6, which are shown in FIGURE 8 as hatched areas, said sectors being covered by metal grids and serving as decircularizers. The transparent sectors consisting of polystyrene foam are denoted by reference number 7. When the transparent sector 7 covers the horn 4 during rotation of the disc 5, circularly polarized waves are emitted into the space, while on the contrary, when the non-transparent sector 6 is opposite the front surface of horn 4, linearly polarized waves are transmitted under the influence of said decircularizer. Thus, a polarized wave is continuously transmitted through the space during a certain time interval. It should be noted, however, that by modifying the relative relation between the centre of the rotatable disc and that of the horn, any desired selection of the kind of linearly polarized waves, such as horizontally-, 45°-, vertically and the like polarized waves, can be realized. Further in this instance, the circularly polarized waves radiated from the horn into space are converted periodically into the linearly polarized waves by a rotating disk having a decircularizer, thereby the circularly polarized waves and the linearly polarized waves are radiated alternatively into the space. However, if the device shown in FIG. 3 is used not as a circularly polarized wave generator, it is possible to radiate elliptically polarized waves and linearly polarized waves alternatively into the space. If, in this case, the position of the rotating disk having a decircularizer is always set to align the direction of metal grids of the decircularizer with the direction of major axis of the elliptically polarized waves, the elliptically polarized waves are converted into the linearly polarized waves when sector 6 is in front of the horn, and the elliptically polarized waves is radiated directly into the space when sector 7 is in front of the horn. Moreover as is mentioned hereinbefore, it is possible to generate any shape of elliptically polarized waves (it is possible to set arbitrarily the direction of major axis and axial ratio of ellipse) by setting the twist angle of the device shown in FIG. 3 and the inserted depth of circularizer. Hence, by setting the shape of the elliptically polarized waves in order that minimum sensibility of echo signal is obtained for the clutter (or specific target), the clutter (or specific target) can be identified when a colored display is carried out, since the sensibility decreases suddenly when converted into the elliptically polarized waves than when converted into linearly polarized waves. The decircularizer may be alternatively disposed also in the circular wave guide. It will be clear to those skilled in the art, various other modifications could be devised in this respect.

Figure 9:
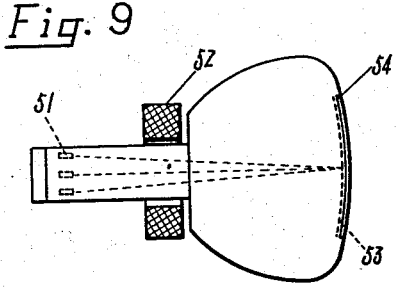
FIGURE 9 shows a diagrammatic representation of one embodiment of a cathode ray tube for color displays for use in the present system.

FIGURE 9 shows an example of a shadow-mask type cathode ray tube including electron guns 51, deflection coils 52, shadow-mask 53, and phosphor-dot screen 54 for red, blue and green colors.

The gate voltage such as shown in FIGURE 6 is applied to cathode or control grid of the CRT for color displays, i.e. wherein images of different colors corresponding to the gate voltage are produced on the screen. By carrying out high-speed change-off to convert the polarized waves, a combined image of different colors, corresponding to the selected polarizations, will appear on the screen.

Figure 10:
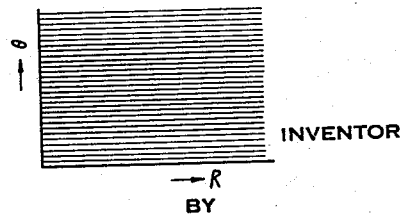
FIGURE 10 represents an example of B-display obtainable by the color image composition of a plurality of single colored echo signal images.

When a shadow-mask type CRT is used, the indicating system is, as shown in FIGURE 10, generally of the B-display. Now, two various targets, such as marine steel and wooden vessels are considered. As the radar waves, horizontally-, circularly- and vertically polarized waves are employed, and by the resulting gate voltage, the color beams of red, blue and green, the electron beams for color displays of the CRT are controlled. In case of a steel vessel, the echo signal intensity is not varied substantially with use of above mentioned three kinds of polarized waves. Thus the image produced on the screen will show white, which is the combined color in this case. In case of the wooden vessels, if horizontally and vertically polarized waves are employed, there would be substantially no difference in the echo signal intensity, while on the other hand, if circularly polarized waves are employed, the echo signal intensity would be reduced less than half the original value. Thus, the screen image of the wooden ship will become white yellow.

A further example, targets such as double reflection type reflectors and corner reflectors will now be considered. As the radar waves, horizontally-, circularly- and 45°-polarized waves are employed, and the gate voltage the color beams of the CRT are controlled. In case of the double reflection type reflector, the echo signal intensity will not differ with use of horizontally and circularly polarized waves, and the intensity will be nil with 45°-polarized waves, so that the resulted image on the screen will be colored violet. In the case of the corner reflector, however, the echo signal intensity will not appreciably differ with horizontally and 45°-polarized waves, and it will amount to nil with circularly polarized waves, so that the screen image of the target will be colored yellow.

More detailed identification of, for instance, a town; a forest or the like on an island as a target, will be attainable to a certain degree, by suitably selecting the kinds of polarization of the transmitting radar waves.

Although in the preceding examples, only the shadow-mask type cathode ray tube for color displays has been referred to, any other type of the tube, for instance, of the Lawrence type, may be equally employed for the purpose. In this case, color mixing may be carried out by means of P.P.I. images. In all these cases, however, it is important to select a proper scanning rate to match with the after glow characteristics in relation to the primary colors of red, blue and green. For this purpose, the insertion of suitable memory devices in a suitable intermediate position would be preferably and frequently required.

It will be noted from the foregoing, that the present invention provides a method to identify the targets by selecting the suitable kinds of polarization and assigning a single color (red, blue, green) to each echo signal on the screen and viewing the mixed color image. Thus enabling the solution, to a certain degree, of the problem of identification of targets, which has heretofore been considered as highly difficult to solve.

Although only preferred embodiments of the invention have been illustrated in the accompanying drawing and described in the foregoing specification, it is to be expressly understood that the invention is not limited thereto. For instance, while in the preceding embodiment a color CRT is employed to combine various color signals, it is also possible a plurality of mono-chrome CRTs are arranged in use and controlled by the gate voltage each corresponding to the selected polarized waves, and the resulted images are passed through various colored filters and composed optically. While, on the other hand, in all of the embodiments as set forth hereinbefore, the polarization of the radar wave is successively modified and the desired polarization is selected thereof, the invention is not always so limited. For instance, separate transmitting systems for transmitting horizontally-, circularly-, 45°-, and the like radiating waves may be provided and the high-speed conversion from one after another thereof may be employed. Other modifications, such as in the specific shapes and sizes of the parts illustrated, may be made without departing from the spirit, scope, and objects of the invention, as will now be apparent to those skilled in the art.

What I claim is:

1. A radar target identification system comprising: means for transmitting a plurality of differently polarized waves successively towards said target, said transmitting means including a horn type antenna for radiating circularly polarized waves and a high-speed converting mechanism including a rotary disc including a decircularizer disposed in front of said horn type antenna and means for rotating said rotary disk to change the degree of decircularization so that waves of the same polarization mode are radiated in space during a certain time interval and changed over to another polarization mode in an abrupt manner; means for receiving only echo waves of the same polarization as the transmitted waves; a plurality of color image generating means responsive to said receiving means, each of said color image generating means producing a different component color image for each of the differently polarized received waves respectively, the intensity of a component color image being proportional to the amplitude of the associated echo wave; and means for composing said plurality of different component color images into a multi-colored image.

2. A radar target identification system comprising: means for transmitting a plurality of differently polarized waves successively towards said target, said transmitting means including means for producing elliptically polarized waves to obtain maximum sensitivity with respect to predetermined targets that are to be identified; means for receiving only echo waves of the same polarization as the transmitted waves; a plurality of color image generating means responsive to said receiving means, each of said color image generating means producing a different component color image for each of the differently polarized received waves respectively, the intensity of a component color image being proportional to the amplitude of the associated echo wave; and means for composing said plurality of different component color images into a multi-colored image.

References Cited in the file of this patent

UNITED STATES PATENTS

| | | |
|---|---|---|
| 2,607,849 | Purcell et al. | Aug. 19, 1952 |
| 2,619,635 | Chait | Nov. 25, 1952 |
| 2,691,162 | Geer | Oct. 5, 1954 |
| 2,758,298 | Sunstein | Aug. 7, 1956 |
| 2,969,537 | Mannheimer et al. | Jan. 24, 1961 |

FOREIGN PATENTS

| | | |
|---|---|---|
| 1,098,087 | France | Mar. 2, 1955 |
| 750,600 | Great Britain | June 20, 1956 |